United States Patent
Reuter

(10) Patent No.: US 9,452,744 B2
(45) Date of Patent: Sep. 27, 2016

(54) PEDAL FORCE SIMULATOR AND BRAKE SYSTEM

(71) Applicant: Dr. Ing. h.c. F. Porsche Aktiengesellschaft, Stuttgart (DE)

(72) Inventor: Uwe Reuter, Althengstett (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 0 days.

(21) Appl. No.: 14/804,370

(22) Filed: Jul. 21, 2015

(65) Prior Publication Data

US 2016/0023643 A1    Jan. 28, 2016

(30) Foreign Application Priority Data

Jul. 22, 2014    (DE) .................. 10 2014 110 300

(51) Int. Cl.
*B60T 7/04*    (2006.01)
*B60T 8/40*    (2006.01)

(52) U.S. Cl.
CPC .................... *B60T 8/409* (2013.01)

(58) Field of Classification Search
CPC .... B60T 8/409; B60T 8/4081; B60T 8/4077; B60T 7/042; B60T 13/686; B60T 13/745
IPC ........................................................ B60T 7/04
See application file for complete search history.

(56) References Cited

U.S. PATENT DOCUMENTS

| | | | |
|---|---|---|---|
| 6,547,342 B1* | 4/2003 | Schaust .............. | B60T 7/042 303/11 |
| 2014/0144732 A1 | 5/2014 | Bayer et al. | |
| 2014/0157771 A1* | 6/2014 | Jeon ................. | B60T 17/08 60/591 |
| 2015/0028667 A1* | 1/2015 | Leiber .............. | B60T 13/662 303/15 |
| 2015/0166023 A1* | 6/2015 | Ryu .................. | B60T 7/042 303/3 |

FOREIGN PATENT DOCUMENTS

| | | |
|---|---|---|
| DE | 197 57 996 | 9/1998 |
| DE | 100 39 670 | 3/2002 |
| DE | 10 2006 030 846 | 1/2008 |
| DE | 10 2010 024 735 | 12/2011 |
| JP | 5201328 A | 8/1993 |
| JP | 2010000925 A * | 1/2010 |
| WO | 2012/150108 | 11/2012 |

OTHER PUBLICATIONS

German Search Report of Mar. 23, 2015.
Japanese Office Action Dated Jun. 29, 2016.

* cited by examiner

*Primary Examiner* — Anna Momper
*Assistant Examiner* — Stephen Bowes
(74) *Attorney, Agent, or Firm* — Gerald E. Hespos; Michael J. Porco; Matthew T. Hespos

(57) ABSTRACT

A pedal force simulator for a hydraulic brake system of a vehicle has a simulator chamber and a simulator piston that can be moved along a working path within the simulator chamber. The pedal force simulator has a line arrangement by which the simulator chamber can be brought into fluid communication with a pressure chamber of a brake cylinder of the hydraulic brake system. The line arrangement has a valve arrangement, the throttling effect of which depends on the position of the simulator piston along the working path.

11 Claims, 1 Drawing Sheet

PEDAL FORCE SIMULATOR AND BRAKE SYSTEM

CROSS REFERENCE TO RELATED APPLICATION

This application claims priority under 35 USC 119 to German Patent Appl. No. 10 2014 110 300.9 filed on Jul. 22, 2014, the entire disclosure of which is incorporated herein by reference.

BACKGROUND

1. Field of the Invention

The invention relates to a pedal force simulator for a hydraulic brake system of a vehicle.

2. Description of the Related Art

WO 2012/150 108 A1 discloses a pedal force simulator that can give the user of a brake system a familiar brake pedal feel, even though the braking force is not produced directly by the actuating force applied manually by the user at the brake pedal. Instead, modulation of the braking torque in a manner dependent on the foot force of the user is performed by an external force, e.g. an electric motor, a compressor or the like due to electronic signal transmission (also referred to as "brake-by-wire"). The pedal force simulator gives a haptic feedback in the form of a predetermined force/displacement behavior to the user as the vehicle brake pedal is actuated. The feedback corresponds to the actual braking behavior of the vehicle brake system to make it easier for the vehicle driver to proportion the braking force. The predetermined force/displacement behavior can simulate a braking feel that is familiar from conventional hydraulic vehicle brake systems.

It is an object of the invention to provide a pedal force simulator that gives the user of the brake system an improved and more realistic braking feel.

SUMMARY OF THE INVENTION

This invention relates to a pedal force simulator for a hydraulic brake system of a vehicle. The pedal force simulator has a simulator chamber and a simulator piston that can be moved along a working path in the simulator chamber. The pedal force simulator has a line arrangement by which the simulator chamber can be brought into fluid communication with a pressure chamber of a brake cylinder of the hydraulic brake system. The line arrangement has a valve arrangement that provides a throttling effect that depends on the position of the simulator piston along the working path.

The pedal force simulator of the invention has the advantage over the prior art that the throttling effect of the valve arrangement depends on the position of the simulator piston. The damping of the brake system is modified or switched in accordance with the position of the simulator piston. In this way, the braking feel for the vehicle driver can be improved, thereby making it possible to improve the suitability of the pedal force simulator for use on circuits.

The line arrangement may comprise a main line and a secondary line that is connected in parallel with the main line. The main line and the secondary line open into the simulator chamber independently of one another. The valve arrangement may comprise a main valve in the main line, and a secondary valve in the secondary line. Damping thus is achieved by two separate valves.

The pedal force simulator may be designed so that the simulator piston is moved along the working path from an initial position with increasing deflection of a brake pedal of the brake system. In this case, the pedal force simulator may be designed so that the secondary line is in fluid communication with the simulator chamber when the simulator piston is in the initial position. Fluid communication between the secondary line and the simulator chamber may be blocked when the simulator piston is moved along the working path by a predetermined distance. Fluid communication between the secondary line and the simulator chamber may be enabled automatically when the simulator piston is in or close to the initial position and may be blocked when the simulator piston is deflected from the initial position by the distance. Blocking the secondary line also deactivates the secondary valve so that only the main valve allows a compensating flow between the simulator chamber of the pedal force simulator and the master cylinder of the brake system. Damping thus increases abruptly when the simulator piston is deflected beyond the distance.

The secondary line may open into the simulator chamber so that the opening of the secondary line is exposed when the simulator piston is in or close to the initial position, and the opening of the secondary line is blocked by the simulator piston when the simulator piston is moved along the working path by a predetermined distance. The simulator piston may have a passage that extends from a wall of the simulator piston to a functional surface of the simulator piston that faces the simulator chamber. The wall may face the opening of the secondary line when the simulator piston is in the initial position. The simulator piston may comprise a main body in which the passage is formed and the main body may block the opening of the secondary line into the simulator chamber when the simulator piston is deflected beyond the distance determined.

A recess may be formed in the simulator piston in the region of the wall, from which the passage extends to the functional surface. The size of the recess parallel to the working direction is used to determine the distance by which the simulator piston can be deflected from the initial position before the opening of the secondary line is blocked and the secondary valve is thus deactivated. The maximum extent of the recess parallel to the working direction may correspond substantially to the predetermined distance.

The throttling effect of the secondary valve may be adjusted during operation of the pedal force simulator. Thus, the resistance of the pedal force simulator can be matched in an optimum manner to the requirements of the brake system or to the individual requirements of the user. The throttling effect of the secondary valve also may be adjustable during operation.

The pedal force simulator may have a return means for returning the simulator piston to the initial position thereof counter to the working path. The return means may be of elastic and/or deformable design. The return means may have a compression spring and a rubber buffer arranged behind the torsion spring along the working path.

The invention also relates to a brake system for a vehicle having a brake cylinder coupled to a foot brake pedal and the above-described pedal force simulator. The pedal force simulator may be connected with a pressure chamber of the brake cylinder.

Further details of the invention will become apparent from the drawings and from following description with reference to the drawings. The drawings illustrate only illustrative embodiments and do not restrict the essential concept of the invention.

DETAILED DESCRIPTION

Figure 1:
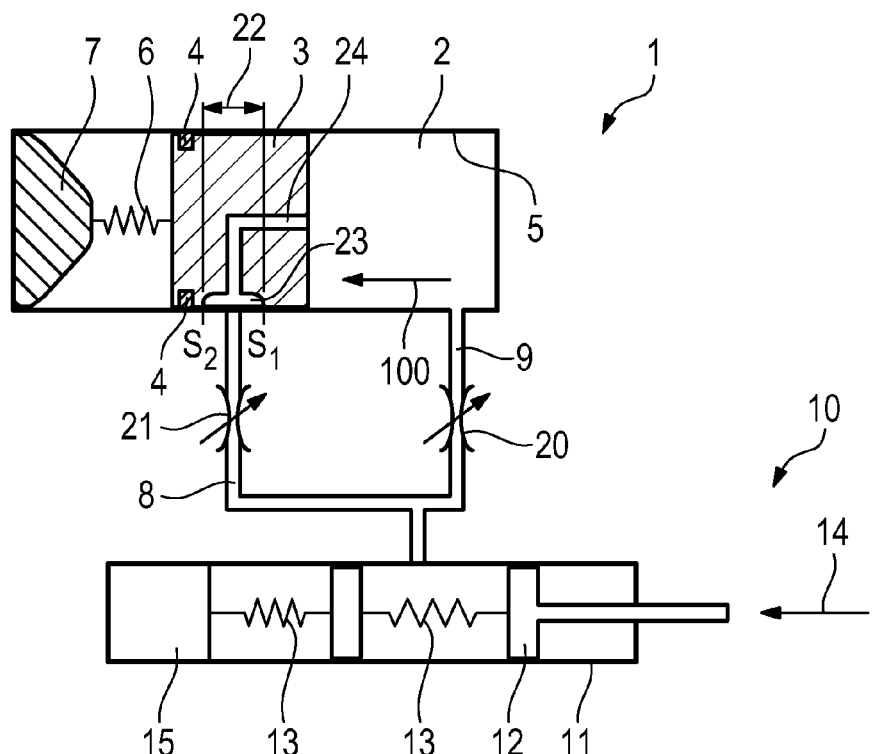
FIG. 1 is a schematic view of a brake system of a vehicle having a pedal force simulator according to an illustrative embodiment of the present invention.

FIG. 1 is a schematic view of a brake system 10 of a vehicle having a pedal force simulator 1 according to an embodiment of the invention. The brake system 10 comprises a brake cylinder 11 and a brake piston 12 moveably supported in the brake cylinder 11. The brake piston 12 is coupled to a brake pedal (not depicted) of the vehicle and can be deflected counter to the force of two return springs 13 by the brake pedal by a vehicle driver. In this case, the brake piston 12 moves in a deflection direction 14.

The brake system 10 is a "brake-by-wire" brake system, i.e. the braking force is not produced directly by the actuating force applied manually to the brake piston by the user but, instead, the deflection of the brake piston is evaluated electronically by braking electronics 15 and transmitted by electronic signal transmission to a braking force generator that produces the braking force.

To give the user the realistic braking feel of a hydraulic braking force system, the brake system 10 has a braking force simulator 1 that gives the user haptic feedback in the form of a predetermined force/displacement behavior as the vehicle brake pedal is actuated. The haptic feedback corresponds to the actual braking behavior of the vehicle brake system to make it easier for the user to proportion the braking force.

For this purpose, the pedal force simulator 1 has a simulator chamber 2 and a simulator piston 3 supported in the simulator chamber 2 in a manner that allows the simulator piston 3 to be moved along a working path 100. The simulator piston 3 is sealed off with respect to the wall 5 of the simulator chamber 2 by an encircling seal 4. A return is arranged in the simulator chamber 2 and comprises a torsion spring 6 designed as a compression spring and a rubber buffer 7. The torsion spring 6 moves the simulator piston 3 into the initial position thereof counter to the working path 100 when the brake pedal is unactuated.

The simulator chamber 2 and the brake cylinder 11 are in fluid communication with one another by means of a main line 9 and a separate secondary line 8 separate from the main line 9. The main line 9 has a main valve 20, while a secondary valve 21 is arranged in the secondary line 8. The main valve 20 and the secondary valve 21 throttle the fluid flow through the main line 9 and the secondary line 8, depending on the setting. The throttling effect of the main valve 20 and/or of the secondary valve 21 may be adjustable during operation of the pedal force simulator 1.

The pedal force simulator 1 is designed so that the secondary line 8 is in fluid communication with the simulator chamber 2 only when the simulator piston 3 is in or close to the initial position. Fluid communication between the secondary line 8 and the simulator chamber 2 is blocked by the simulator piston 3 when the simulator piston 3 is moved along the working path 100 at least by a predetermined distance 22. This is achieved because the wall of the simulator piston 3 that faces the opening of the secondary line 8 into the simulator chamber 2 has a recess 23 with a maximum extent parallel to the working path 100 that defines the value of the predetermined distance 22. The recess 23 also opens into an inner passage 24 in the simulator piston 3 and opens into the simulator chamber 2 on a side facing away from the torsion spring 6.

The brake piston 12 is deflected when the user of the braking force system 10 actuates the brake pedal, and, as a result, fluid flows out of the brake cylinder 11 into the simulator chamber 2 via the main line 9. The secondary line 8 also is in fluid communication with the simulator chamber 2 via the recess 23 and the inner passage 4, and fluid also flows from the brake cylinder 11 into the simulator chamber 2 via the secondary line 8. Thus, the fluid is throttled by the main valve 20 and the secondary valve 21. The simulator piston 12 is deflected out of the initial position thereof along the working path 100 (see FIG. 1).

At some point, the simulator piston 12 has been deflected by the predetermined distance 22 along the working path 100, and the opening of the secondary line 8 reaches the outer limit of the recess 23. The opening of the secondary line 8 then is blocked by the wall of the simulator piston 3. From this point on, fluid can only pass into the simulator chamber 2 via the main line 8. Accordingly, the resistance rises abruptly because the flow cross section available to the fluid is reduced by the deactivation of the secondary line 8. The damping by the pedal force simulator 1 is thus dependent on the position of the simulator piston 3 along the working path 100 and switches over automatically once the working piston 3 has moved by the predetermined distance 22.

Figure 2:
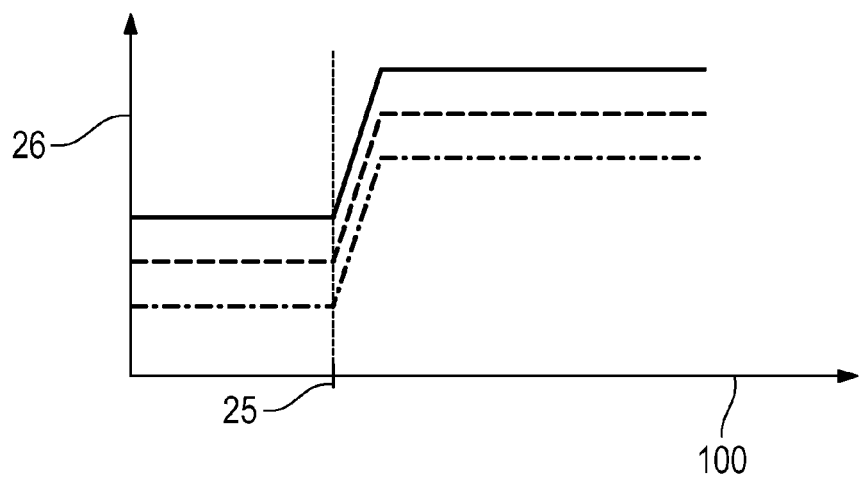
FIG. 2 shows the pedal damping of the pedal force simulator according to the illustrative embodiment of the invention.

The pedal damping 26 of the pedal force simulator 1 as a function of the position of the simulator piston 3 along the working path 100 is illustrated in FIG. 2 for different throttle settings. From the diagram, it can be seen that the damping rises abruptly when the predetermined distance 22 is reached since the secondary line 8 is in each case blocked by the simulator piston 3 when the predetermined distance 22 is reached.

What is claimed is:

1. A pedal force simulator for a hydraulic brake system of a vehicle, the pedal force simulator comprising: a simulator chamber; a simulator piston that can be moved along a working path in the simulator chamber, the simulator piston being moved along the working path from an initial position with increasing deflection of a brake pedal of the brake system; and a line arrangement by which the simulator chamber can be brought into fluid communication with a pressure chamber of a brake cylinder of the hydraulic brake system, the line arrangement including a main line and a secondary line connected in parallel with the main line, the main line and the secondary line opening into the simulator chamber independently of one another, the line arrangement having a valve arrangement with a throttling effect that is dependent on a position of the simulator piston along the working path, the valve arrangement comprising a main valve in the main line, and a secondary valve in the secondary line, wherein the secondary line is in fluid communication with the simulator chamber when the simulator piston is in proximity to the initial position thereof, and the fluid communication between the secondary line and the simulator chamber is blocked when the simulator piston is moved along the working path by a predetermined distance.

2. The pedal force simulator of claim 1, wherein the secondary line opens into the simulator chamber so that the opening of the secondary line is exposed when the simulator piston is in proximity to the initial position, and so that the opening of the secondary line is blocked by the simulator piston when the simulator piston is moved along the working path by a predetermined distance.

3. The pedal force simulator of claim 2, wherein the simulator piston has a passage that extends from a wall of the simulator piston to a functional surface of the simulator piston that faces the simulator chamber.

4. The pedal force simulator of claim 3, wherein the wall faces the opening of the secondary line when the simulator piston is in the initial position.

5. The pedal force simulator of claim 4, wherein a recess is formed in the simulator piston in a region of the wall from which the passage extends to the functional surface.

6. The pedal force simulator of claim 5, wherein a maximum extent of the recess parallel to the working path corresponds substantially to the predetermined distance.

7. The pedal force simulator of claim 6, wherein the throttling effect of the secondary valve can be adjusted during the operation of the pedal force simulator.

8. The pedal force simulator of claim 1, wherein the throttling effect of the secondary valve can be adjusted during operation.

9. The pedal force simulator of claim 1, further comprising an elastic and/or deformable return means for returning the simulator piston to the initial position thereof counter to the working path.

10. The pedal force simulator of claim 9, wherein the return means comprises a compression spring, and a rubber buffer arranged behind the compression spring along the working path.

11. A brake system for a vehicle, comprising:
   a brake cylinder coupled to a foot brake pedal, the brake cylinder having a pressure chamber; and
   the pedal force simulator of claim 1, wherein the pedal force simulator is in operative connection with the pressure chamber of the brake cylinder.

* * * * *